(12) United States Patent
Beninato et al.

(10) Patent No.: US 9,189,188 B2
(45) Date of Patent: Nov. 17, 2015

(54) METHOD AND SYSTEM FOR MESSAGE DELIVERY USING A SECURE DEVICE AND SIMPLE OUTPUT WITHOUT THE USE OF A PERSONAL COMPUTER

(71) Applicant: Presto Services Inc., Los Altos, CA (US)

(72) Inventors: Joseph M. Beninato, Mountain View, CA (US); Martin Mazner, Menlo Park, CA (US); Heidi K. Carson, Cupertino, CA (US); David A. Chavez, San Jose, CA (US)

(73) Assignee: Presto Services Inc., Los Altos, CA (US)

( * ) Notice: Subject to any disclaimer, the term of this patent is extended or adjusted under 35 U.S.C. 154(b) by 0 days.

(21) Appl. No.: 14/446,221

(22) Filed: Jul. 29, 2014

(65) Prior Publication Data

US 2014/0333957 A1 Nov. 13, 2014

Related U.S. Application Data

(63) Continuation of application No. 11/238,858, filed on Sep. 28, 2005, now Pat. No. 8,832,316.

(60) Provisional application No. 60/614,287, filed on Sep. 28, 2004, provisional application No. 60/667,832, filed on Apr. 1, 2005.

(51) Int. Cl.
*G06F 15/16* (2006.01)
*G06K 15/00* (2006.01)
*G06F 3/12* (2006.01)
*H04L 12/58* (2006.01)
*H04L 29/06* (2006.01)
*H04L 29/08* (2006.01)

(52) U.S. Cl.
CPC ............ *G06F 3/1238* (2013.01); *G06F 3/1222* (2013.01); *H04L 12/5835* (2013.01); *H04L 51/066* (2013.01); *H04L 67/02* (2013.01); *G06F 3/1296* (2013.01); *H04L 12/585* (2013.01); *H04L 63/166* (2013.01); *H04L 67/125* (2013.01); *H04L 67/306* (2013.01)

(58) Field of Classification Search
USPC ........... 709/246, 206, 200; 345/467; 358/1.15
See application file for complete search history.

(56) References Cited

U.S. PATENT DOCUMENTS

| | | | | |
|---|---|---|---|---|
| 5,761,415 | A * | 6/1998 | Joseph et al. | 709/200 |
| 6,836,789 | B1 * | 12/2004 | Toyoda | 709/206 |
| 7,061,632 | B1 * | 6/2006 | Livingston | 358/1.15 |
| 2001/0048436 | A1 * | 12/2001 | Sanger | 345/467 |
| 2002/0116463 | A1 * | 8/2002 | Hart | 709/206 |
| 2004/0078448 | A1 * | 4/2004 | Malik et al. | 709/206 |
| 2005/0021648 | A1 * | 1/2005 | Ogasawara et al. | 709/206 |

* cited by examiner

*Primary Examiner* — Kiet G Tang
(74) *Attorney, Agent, or Firm* — Orrick, Herrington & Sutcliffe, LLP

(57) ABSTRACT

Communication systems and methods for enhancing communications between users featuring a central service which formats messages into a printer-friendly format. The format of the delivered message is based on preference settings established by the recipient or an authorized agent of the recipient. The messages are delivered to a device, such as a printer. Messages can be sent to the service in any format and can include text, photographs, URLs, and/or a variety of file types. The messages are then parsed by the service and formatted for delivery to the device.

7 Claims, 4 Drawing Sheets

METHOD AND SYSTEM FOR MESSAGE DELIVERY USING A SECURE DEVICE AND SIMPLE OUTPUT WITHOUT THE USE OF A PERSONAL COMPUTER

CROSS REFERENCE TO RELATED PATENT APPLICATIONS

This application is a continuation of U.S. patent application Ser. No. 11/238,858, filed on Sep. 28, 2005, which claims the benefit of and priority to U.S. provisional application Nos. 60/614,287 filed Sep. 28, 2004 and 60/667,832 filed Apr. 1, 2005. Priority to these prior applications is expressly claimed, and the disclosures are hereby incorporated by reference in their entireties.

FIELD

The disclosure relates to communication systems and methods that facilitate communications using a printer-based device to format and print messages sent in a variety of formats.

BACKGROUND

Older adults have become the fastest-growing segment of the United States population, and their numbers are expected to double from 35 million to 70 million between 2000 and 2030. Currently, nearly eighty percent of adults over the age of sixty do not use the Internet and are therefore disconnected from digital communications such as email, instant messaging, web browsing and short messaging service ("SMS") that their younger family members and friends take for granted.

At the same time, digital photography is replacing traditional photography, and the number of digital cameras sold in the United States is expected to grow to 24 million in 2008. Current systems exist for the transmission of photographs to users without a computer or to users who are unable to sufficiently operate a computer. However, these systems are not able to receive formatted email messages, newsletters, and other information and do not allow the user to obtain a printed copy of the photograph instantly.

Therefore, a need exists for a system that allows users to share information with seniors via a device in a manner that is easy to use given the technological skill level of some seniors. Furthermore, the need exists for such a system that also allows a caregiver to configure the device based on the needs of the senior and to monitor the device to ensure that it is operational.

SUMMARY

The present system allows non-computer users, such as seniors, to receive email, photos, newsletters, content from the worldwide web and other personalized information from family, friends, and trusted content providers. In general, the present system allows a person having moderate technological skills, such as an adult child caregiver, to control the operation of a device used by the senior.

The system comprises both software and hardware. The software component, referred to as "the service", is preferably a worldwide web-based service with a backend network that receives digital photos, email messages, and content from various approved sources. The service formats the messages for delivery to a user-friendly hardware device. The device is typically a printer with unique hardware and interface protocols that allows downloading and printing of information from the service, and, in further embodiments, allow the senior to respond to messages via the service. The service also stores and processes feedback from the device and takes various actions based on the status of the device.

The service includes a web-based interface that allows a user, such as the caregiver, to configure the device, monitor the status of the device, and perform other functions to enhance the use of the device. Through a worldwide web-based interface, the caregiver can configure the format of the messages delivered to the senior. For example, the caregiver could increase the font size of the message so that it is easier for the senior to read. Other forms of formatting are also available, such as highlighting, bolding, etc. The user can also create settings for vacation stops on incoming messages.

The system also allows the caregiver to be informed of problems with the device. For example, the caregiver may receive a message from the system that the device is low on ink or paper, has a paper jam, has been manually turned off, etc. The caregiver may receive such notification via any means known in the art such as email, SMS, automated phone call, or the like. Once the caregiver receives notification of the event, the caregiver can contact the senior or other party to remedy the situation or schedule a time to fix the problem. For example, after receiving an alert that ink levels are low, the caregiver may contact an ink vendor to order additional ink cartridges. The system could then send a message to the caregiver and/or senior letting them know that additional ink has been ordered.

Information such as emails and photographs can be uploaded by the caregiver and/or other parties to the service. The service then processes and formats the information into a printer-friendly format based on the senior's configuration settings and transmits this information to the senior's device. Formatting also ensures that the information can properly fit appropriate paper sizes. Information is transferred by the service to the device when the device connects with the service. In one embodiment, the device communicates with the system once per day. As with other settings, the caregiver and/or senior can modify the number of times the device calls into the service. In addition, the device can include a "connect now" button or menu item that allows the senior to connect to the service immediately. Alternatively, the service can force a connection with the device to transmit information to the device.

Information transferred to the device is printed out or otherwise displayed to the senior by the device. The information transferred by the system can include documents, photographs, printouts of universal resource locators ("URLs") or the pages displayed at those URLs, etc. For example, the caregiver can upload a picture from a recent vacation onto the service. The next time the device connects to the service (i.e. at a regularly scheduled time, or a selected time using the "connect now" feature), the photograph would be printed out or displayed on the device.

In addition, the system can transfer software upgrades to the device when the device communicates with the system. The system can also allow for third-party information to be transferred to the senior via the device if desired. For example, the senior can receive a daily newsletter, such as a horoscope, sports scores, etc. The caregiver can configure the system such that it allows a third-party to upload such information onto the senior's service. The next time the senior's device communicates with the service, this newsletter would be sent to the senior's device.

Preferably, the system comprises security and spam (i.e., junk email) filtering features to ensure the privacy of the senior's account information and messages and to prevent undesired messages from being received.

Other systems, methods, features and advantages of the various embodiments disclosed herein will be or will become apparent to one with skill in the art upon examination of the following figures and description.

BRIEF DESCRIPTION OF THE DRAWINGS

Preferred embodiments are illustrated by way of example, and not by way of limitation, in the figures of the accompanying drawings, in which like reference numerals refer to like components.

DESCRIPTION OF THE PREFERRED EMBODIMENTS

In the following description, the primary user of the system is referred to as a "senior." The person who monitors the senior's account and assists in configuring the system is referred to as the "caregiver." Although this discussion reflects an exemplary situation in which an adult-child caregiver assists her senior parent in using the system, the system is in no way limited to this type of relationship. Furthermore, within this description it is contemplated that the caregiver will perform many of the programming steps, maintenance checks, and other duties. However, the senior or other authorized person can also complete each of the duties herein described as being assigned to the caregiver.

Figure 1:
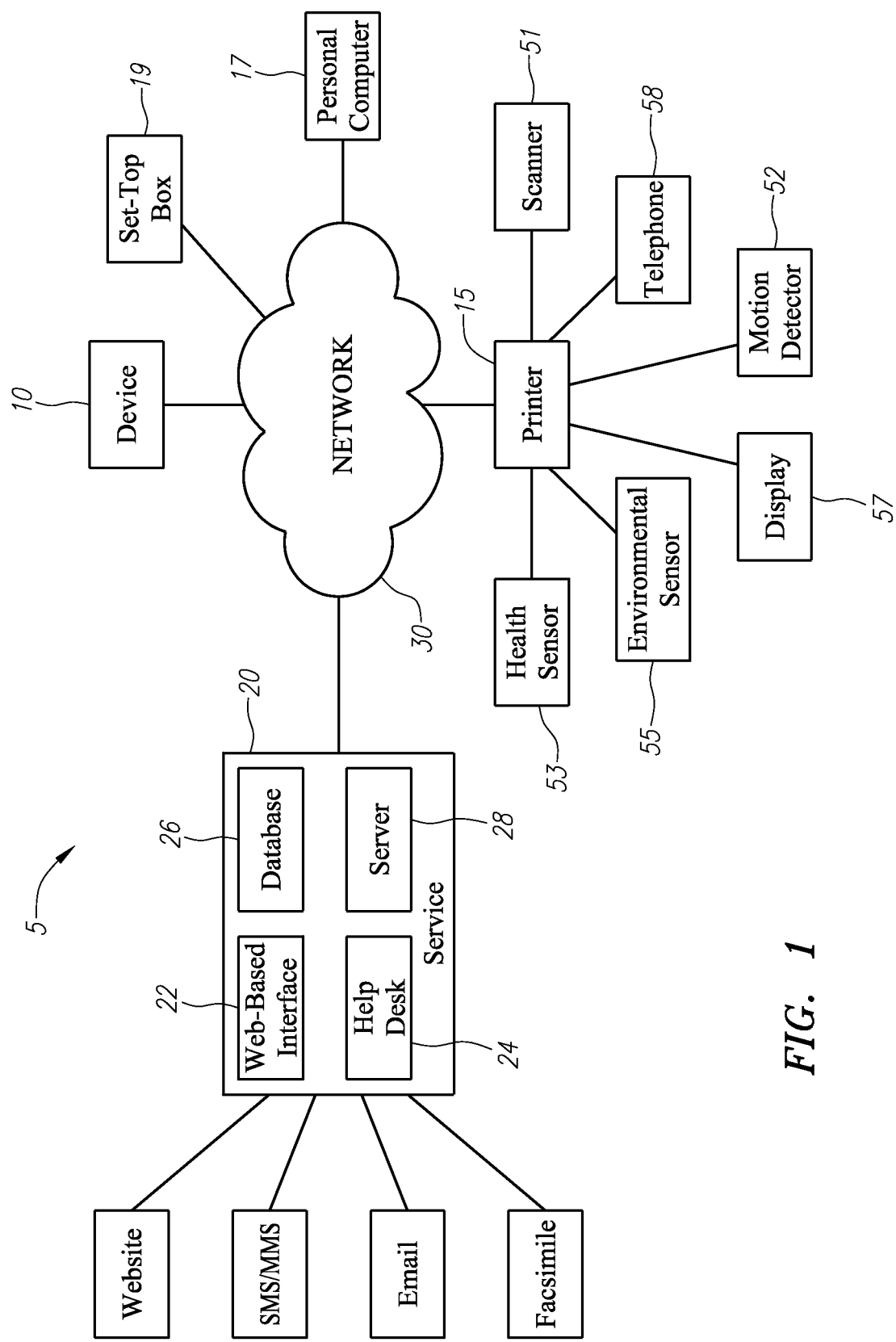
FIG. 1 is a schematic of the communications system of the present invention showing connections between the user device, network, central service, and other parties.

The system 5 of the present invention preferably includes a user device 10, a central service 20, and a network 30 that connects the device 10 to the central service 20 (FIG. 1). In presently preferred embodiments, the device 10 is a modified ink-jet printer 15. However, other display and printing technologies can be used as well such as a dye-sublimation printer, laser printer or the like. Each printer 15 includes a unique serial number and model number that is preferably easily accessible by the senior and/or caregiver. As described further below, the serial number can be provided to a help desk 24 to facilitate resolution of problems with the printer 15. The housing of the printer 15 preferably includes a data modem network interface ("NIC") or other means of communicating with a computer network. The printer also preferably houses computing resources to buffer, decompress, render, and print content, and custom software or firmware to control the printer 15.

Preferably, the printer 15 comprises one or more telephone jacks, such as RJ-11 jacks, to enable either a direct or "passthrough" connection to the network 30. The printer 15 typically includes one or more user buttons and LEDs for status indication. The printer 15 can also comprise one or more ports configured to receive a connection from a sensor or other equipment that allows such equipment to be removably coupled with the printer 15. The printer 15 can also include other features such as a telephone 58, answering machine, scanner 51, video camera, still camera, audio and video inputs, Ethernet interface, wi-fi, or infrared interface. The printer 15 can also be connected to a display unit 57 such as a LCD or television. In this embodiment, the senior could view the messages and photos sent to her on the display unit 57 in addition to being able to print the messages. Each of these other features can be built into the device 10 or be removably coupled to the device by means known in the art.

The device 10 can also comprise a personal computer 17 either with or without an attached printer. In a further embodiment, the user device 10 can be a satellite box, cable television modem, or other similar device known as a "set top box" 19 that is connected to a display unit such as a television. The set top box 19 can also be used in combination with a printer 15 or other printing means to provide printout versions of the messages.

The printer 15 or other device is connected to the service 20 via a computer network 30 such as the Internet, DSL, a phone line, wireless WAN, cable television or satellite box, or other means know in the art. For example, the printer 15 can connect to the service 20 by dialing into a local phone line. When the printer 15 is first used, the default phone line can be an 800 or other toll-free number. The service 20 can then detect the printer's call in number and select a local phone number for future connections with that printer 15. The selected phone number would then be transmitted to the printer 15 and stored by the printer 15 for future connections. If the senior moves, the old dial-up phone number could be subject to toll charges. Therefore, the caregiver preferably updates the senior's new phone number via the web-based interface 22 described below prior to the first use of the printer 15 at the new residence. Alternatively, the service 20 can determine from the caller identification that the senior's printer 15 is now dialing from a different location. In either scenario, the service 20 can provide a new, local dial-up number and downloads this new parameter to the printer 15 so that the printer 15 uses the local dial-up for subsequent connections. Preferably, the service 20 sends a confirmation email or other form of message to the caregiver to confirm that the newly assigned phone number is the best phone number for the senior's new location and provides a list of alternative phone numbers. The caregiver can then respond if the phone number selected is not the most optimal and/or select a different phone number using the web-based interface 22 or help desk 24.

The printer 15 also preferably includes both a TCP/IP protocol stack and HTTP/HTTPS protocols. In a preferred embodiment, all communication is performed using HTTP requests with, or without secure sockets layer (SSL). The caregiver or senior can adjust these connection parameters through the service 20 using methods described further below.

In a preferred embodiment, the service 20 includes a web-based interface 22, a customer support help desk 24, a database 26, and a server 28 that communicates with the printer 15 via the network 30. The web-based interface 22 can be implemented with standard web hosting tools and technology and preferably utilizes password protection and secure sessions to insure the security and privacy of the caregiver's and/or senior's personal and financial information. The web-based interface 22 allows a user of the system such as the caregiver or senior to configure settings for the senior's account. The caregiver, senior, or other authorized person can set up an account and associate it with a particular printer 15 based on the printer's unique identification number. As described further below, the database 26 stores information regarding preferences for delivery times, format for printed messages, and various other parameters.

Using the web-based interface 22, caregivers, authorized users, and the help desk 24 can obtain information regarding the senior's printer 15. This information can include current status, dial-up history, ink levels, paper levels, hardware failures, successful print jobs, etc. Such information can also be obtained using the customer support help desk 24. The help desk 24 can comprise an automated system and/or a live-voice operator.

Users can also access the web-based interface 22 to transmit information to the service 20 that is then processed for delivery to the senior. The web-based interface 22 can serve as a tool to facilitate the generation of content. Sample pages with content could be offered on the web-based interface 22 that allow users to add a personal message or otherwise customize the sample page. That personalized page could then be sent to the printer 15 by clicking a single button. This is possible because the user, after having logged in, will be working with an account that is associated with a particular printer 15. These sample pages can also be sent by the service to other contacts in the senior's address book as described further below. Preferably, the web-based interface 22 also has the capability to allow messages to be created and sent using more standard tools such as text entry and photo attachment. In this case, the web-based interface 22 would allow the sender to format the page and preview the message before sending it.

The service 20 typically stores a large amount of information regarding the senior's account on the database 26. The information includes billing information and primary contact information for billing issues and the printer's serial number to authenticate the senior's connection. The database 26 also stores information regarding a login and password for the senior's account that can be required to authorize any changes to the account's preferences and other information. The information stored on the database 26 further includes preference settings configured by the senior and/or caregiver such as connection preferences, template preferences for content formatting, preferred font size and font type. If the senior's account includes calendaring and appointment information, this information can also be stored on the database 26.

The database 26 can also store an activity log that records the history of connections, connection attempts, ink and other consumable levels, status of the printer, types and sources of content, and the like. In a preferred embodiment, information regarding the last order of consumables and/or the status of the current order of consumables are stored on the database 26. "Consumables" refers to items that the printer 15 uses that require replenishment such as ink, paper and the like.

The database 26 can also retain information regarding messages and content that is currently in the queue and ready for delivery. Information regarding delivered and archived content can also be stored. In a further embodiment, the database 26 can store information regarding all incoming and outgoing emails for the senior's account. This information can include only the date of the message and the name of sender/recipient, or store the entire message or any subset of information as desired.

The system 5 allows users to send messages and other information to the senior's printer 15. The messages are first transmitted by the user to the service 20, and then the service 20 formats the messages for delivery to the senior's printer 15. As described further below, messages are formatted with respect to the configuration settings of the senior's account. As shown in FIG. 1, messages can be sent to the service via email, via instant messaging, RSS, via a website, SMS, multimedia message service (MMS), facsimile, and the like. Messages can also be sent or transmitted to the service 20 by recording a message which is then converted to text for delivery to the senior.

In a preferred embodiment, the senior's printer 15 is designated with an email address. The email address can be based on the senior's telephone number, or other information as desired. Therefore, the caregiver or other user can simply email the information to the senior. For example, users of SMS/MMS-based devices such as mobile phones can send text and/or photo messages to the senior's email account. The information is then processed by the service 20 as described herein and formatted for delivery to the senior based on the senior's configuration settings.

In a preferred embodiment, each printer 15 can support one or more page description language (PDL) such as PostScript and PCL. Preferably, the printer 15 will negotiate an appropriate PDL with the printer 15 that is bandwidth efficient, sufficient quality, and supported by the printer 15. In a preferred embodiment, the printer's firmware or software allows the printer 15 to print data in one or more standard print stream formats.

Email messages that contain file attachments can be opened and formatted by the service 20 for delivery to the printer 15. Preferably, the service 20 is able to format attachments in a wide variety of formats, including, but not limited to GIF, JPG/JPEG/JBIG, BMP, Microsoft Office® files (Word®, PowerPoint®, Excel®), text files, PDF, RTF, or HTML/HTM. The service can also parse video files based on the senior's preference settings. For example, the senior or caregiver can designate that a frame image is transferred once every ten (10) seconds of video. Alternatively, the senior's settings could designate that 20 images are taken from the video file and the time between images is based on the length of the video. For example, if the video were 40 seconds long, one frame every two seconds would be formatted by the service and delivered to the device 10. If the format of the attachment or message cannot be opened by the service, an error message can be sent to the sender and/or senior stating that an unsupported attachment or message was ignored and not transmitted to the printer 15. Preferably, photographs included in the message are automatically formatted by the service 20 to be delivered in the proper form. EXIF attributes embedded into JPG photos give clues about how the photo should be rotated (e.g., in portrait or landscape). The service preferably is able to interpret the EXIF attributes and rotate photos as needed before sending them to the printer 15 without requiring the sender to make such adjustments. The email message can also include a URL link to a website. The service 20 can access the URL, download the content at that link, and configure it such that it is delivered in a printer-friendly format based on the senior's preference settings.

Figure 2:
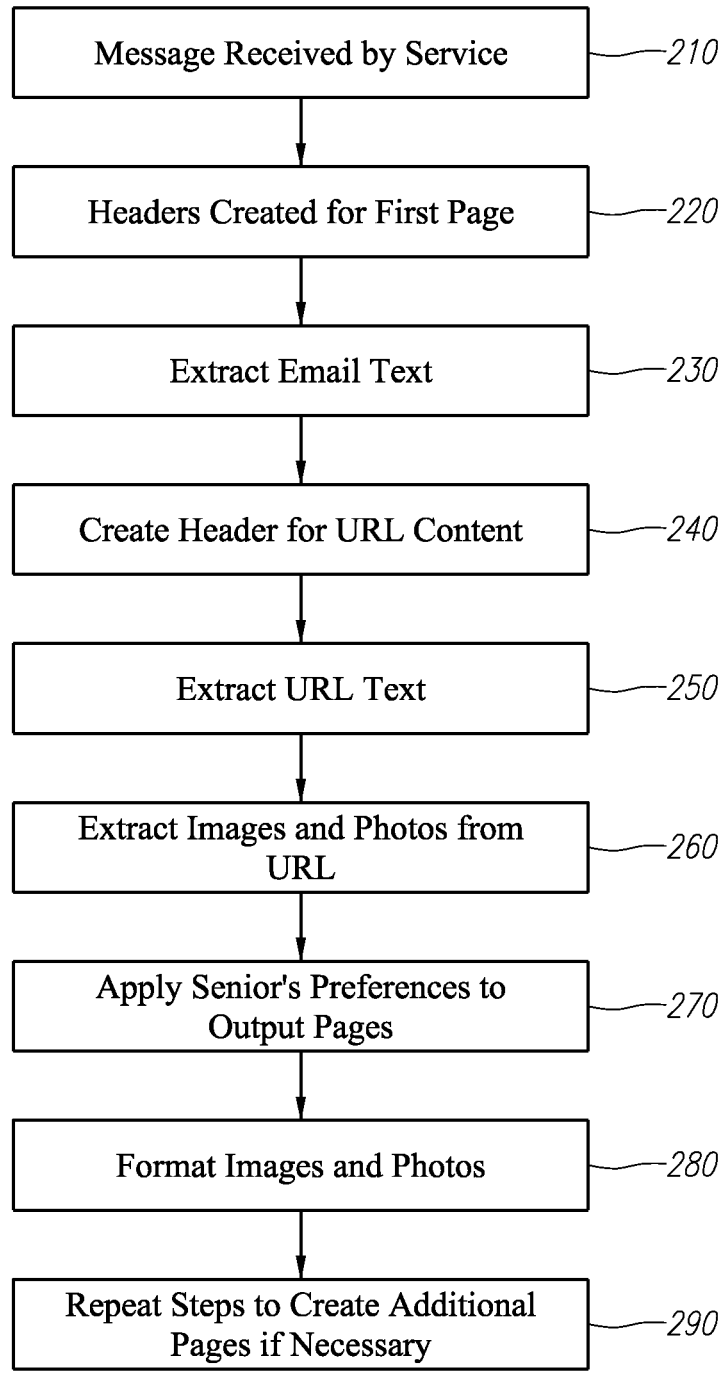
FIG. 2 is a flow chart showing a method of parsing a received message.

The categorization into content components (text, photographs, URLs, etc.) is preferably done using rules that take into account the content source type and the output template preference. For example, an email containing some text and a URL to a web page might be parsed as follows (FIG. 2). After the message is received by the service at step 210, the service can prepare the first output page header, date stamp, and to/from headers (step 220). The email text can then be extracted and marked as message text (step 230). At step 240, a section header can be prepared for the URL content. Next, the main body text from the URL can be extracted and marked as message text (step 250). Photographs and images from the URL that are associated with the main body text can then be extracted and marked as photos (step 260). Optionally, the service 20 is able to ignore all advertisements that appear in the URL. The next step is to format the output pages in conformance with the senior's account preferences (step 270). For example, depending on the font preference, the appropriate font attributes (size, type, color, etc.) are applied to all message text components. Header and footer font preferences are then applied to these portions of the message.

If there is a photo or image to place on the output page, the photo or image can be formatted according to the senior's preferences or other settings (step 280). The senior's preferences can include desired numbers of photographs per page, photograph size, and other desired parameters. For example, the senior and/or caregiver could designate that photographs are sized into standard frame sizes such as 4"×6", 5"×7", 8"×10", 12"×12", and the like. Preferences as to photograph size can be set to have the photographs printed or displayed in Preferably, the photo is sized according to rules that result in the image and text appearing as balanced on the page. Examples of the photo sizing rules are as follows:
  a. A source image's aspect ratio is maintained throughout the process
  b. If a source image's size is larger than the target image size, the source image is reduced and the source image's resolution is increased, up to a maximum of 200 pixels per inch for example
  c. If a source image's size is smaller than the target image size, the source image is increased as required to the target image size, with the limitations of aspect ratio and final image resolution—preferably, the image is not increased in size past the point where the target image's resolution will be less than 100 ppi.
  d. For example:

| Source size x | Source size y | Source resolution | Frame size x | Frame size y | Final size x | Final size y | Final resolution |
|---|---|---|---|---|---|---|---|
| 2" | 2" | 100 ppi | 4" | 5" | 2" | 2" | 100 ppi |
| 35 | 26 | 72 | 8 | 6 | 5.38 | 4 | 200 |
| 10 | 10 | 50 | 3 | 5 | 3 | 3 | 167 |
| 2 | 3 | 100 | 4 | 5 | 2 | 3 | 100 |
| 8 | 6 | 72 | 6 | 5 | 5.76 | 4.32 | 100 |

In a preferred embodiment, message text is placed on the page such that it flows around the placed and sized photos. This format can be modified as desired by the caregiver or senior. If there are any remaining photographs or text, new pages are created as needed (step 290). In a further embodiment, section headers and section breaks can be added to the formatted messages based on the senior's configuration settings. The formatted message would then be placed in a queue for delivery to the senior. In a further embodiment, photographs sent to the senior can also be processed and printed by a web-based third party printing company and then mailed via a postal service to the senior. The senior's account information can store information on her preferred vendor, password and login information for this service, and her history of transactions.

The printer 15 can be configured with several different settings and preferences, such as for connection times and frequency, format of printed messages, alert scheduling, audio and visual displays, and type of content that is delivered to the senior's printer. The configurations can be set by a caregiver, senior or other authorized person using the web-based interface 22, the help desk 24, or menu items on the printer 15. When the printer 15 is connected to the network 30, any configuration setting changes and/or software or firmware updates can be transmitted and stored on the printer 15. For example, if the caregiver has modified the configuration such that the printer 15 connects to the service twice a day rather than once a day, this setting would be downloaded and updated by the printer 15 during the next connection. Likewise, if new, updated software or firmware were available, the printer 15 would obtain this information during the subsequent connection period. If the software or firmware update is expected to take a long time, the display can query the senior whether he or she wishes to postpone the update until a more convenient time. For example, the senior can elect to have the printer 15 connect to the service 20 in the middle of the night to download a large software update. If the printer's firmware or software fails for some unexpected reason, the printer 15 preferably connects to the service 20 via the original, factory default settings. Once the printer 15 is connected to the service 20, the service 20 can then transmit the senior's configuration preferences to the printer 15 to reestablish the senior's settings for future dial-up sessions.

As stated above, the senior's account can be configured to deliver desired content or messages. One type of message that can be delivered to the senior's printer is a daily newsletter. The newsletter can be generated by a third party (such as an internet website) or be generated by the service 20. Topics of the service-generated newsletter can include a variety of subjects such as news, sports, weather, stocks, movie reviews, lottery, health, puzzles, and the like. The senior and/or caregiver can modify the content and format of the newsletter based on the interests of the senior. The frequency and delivery time of the newsletter can also be modified as desired.

In addition to newsletters, selected third party advertisements can be transmitted to the printer 15. The caregiver can program a set of approved vendors, or allow a specified type of vendor to send promotional materials. For example, if the senior is interested in gardening, local nurseries and garden shops could be designated as a class of approved vendors for that senior's account. Other forms of advertisements can be coordinated with events in the senior's calendar. For example, vendors can send suggested gift ideas to the senior's printer 15 when a grandchild's birthday is approaching.

Another form of message that can be sent to the printer 15 is a calendar. The calendar can be sent to the senior on a weekly, monthly, or other regular or irregular basis and include information regarding appointments, holidays, birthdays, etc. The caregiver can input the information for the calendar over the web-based interface 22, using the help desk 24, or by other means discussed herein. The calendar feature can also be used to send advance reminders of appointments to the senior. For example, if the senior's calendar includes a lunch date with a friend, the service 20 could include a reminder of the event with the senior's morning message delivery.

The printer 15 can also comprise channel buttons that can be selected or depressed by the senior to receive specified content. For example, the channel buttons can include a selection for the joke of the day, lottery results, weather, horoscope, and the like. By depressing the desired channel button, the senior could receive the requested information. The channel button can be a button or series of buttons on the printer, or can be embodied in a menu item within the printer's preferences. When the senior depresses the channel button, the selected content can be delivered during the next scheduled connection to the service 20. Alternatively, the senior could use a "connect now" feature to obtain the content prior to the next scheduled connection time.

The caregiver can also program configurations for the format and/or layout of the messages. For example, if the senior has vision difficulties, the font can be set at a larger size, clearer type style, bolded, or highlighted. The font settings can be varied depending on the type of message so that alerts or reminders are printed in a larger and/or bolder font, if desired.

The format or layout of the message can be modified as desired by the senior and/or caregiver. Based on the content of the message, several standard page templates are contemplated. For example, different page templates can be created for (1) text messages; (2) text and photo messages; (3) newsletters; (4) calendars; (5) greeting cards; (6) reminders; (7) alerts; and (8) games or puzzles. In a preferred embodiment, each template includes the sender's name or other identifying indicia, the date, and the page number (e.g. "page 2 of 3"). Within these templates, the caregiver and senior can configure the font and image layout settings as desired.

The printer 15 can be configured to call into or otherwise connect to the service 20 a specified number of times each day and at specific times or time ranges. For example, the senior can designate six (6) am or between 6 am and 7 am as one of the times that the printer 15 connects with the service 20 so that the senior can receive a daily newsletter. The printer 15 can be configured to connect to the service 20 once, twice, or any desired number of times each day. In a further embodiment, the printer 15 can automatically connect to the service 20 by depressing a "connect now" button or selecting a menu item. The printer 15 would then be connected instantly to the service 20 via the network 30 to receive any queued messages being held by the service 20. A senior can use this feature, for example, if she knows that a relative has just sent a new set of photographs. Alternatively, the printer 15 can be continuously connected to the service 20 via a dedicated line or connection. In yet a further embodiment, the service 20 can force a connection with the device 15 such that, for example, an urgent message, alert or other information can be transmitted to the device 15 at any time.

The printer 15 can be programmed to disconnect from the network 30 after a predetermined time or only after all queued information has been transmitted to the printer 15. In addition, if the senior is using a shared telephone line to connect the printer 15 to the network 30, an incoming or outgoing call could automatically terminate the connection to the network 30. In this embodiment, the printer could notify the senior that additional messages in the queue have not yet been received. For example, the printer could display a message or have an indicator light indicating that messages remain in the queue. The senior could then choose to wait until the next scheduled connection time, or utilize a manual connection feature of the printer 15, if available, to create an automatic connection with the network 30. Alternatively, the printer 15 can attempt to reconnect to the service 20 after a predetermined amount of time and continue trying until a connection is made. In addition, if the printer 15 fails to connect with the service 20 during a scheduled connection time or after a "connect now" command is entered, the printer 15 would preferably try again to make a connection. The caregiver can set the number of retry attempts made by the printer 15.

The printer 15 can also be set to a vacation mode. In this mode of operation, the printer 15 still connects to the service 20, but does not receive any delivered printouts. The scheduled connections to the service 20 are maintained to allow changes to the vacation period to be made, other settings to be altered, and for software updates to be downloaded. If desired, during this time, the service 20 can provide a message to people sending messages to the senior that the senior is not available. The vacation mode can be initiated by entering information on the web-based interface 22, using the help desk 24, or through a menu item on the printer.

The printer 15 or device 10 can also be configured to have different auditory and visual indicators depending on the time of day. For example, the any lights on the device 10 can be dimmed during evening and night hours as set by the caregiver and/or senior. In addition, the audio output volume could be adjusted depending on the time of day, etc.

The printer 15 can also be configured to print documents in reverse order so that they appear in sequential order when they are picked up as a bundle from the output tray. If the senior is waiting for messages to arrive, she will see multipage messages printed in reverse order. However, if she waits until the entire multi-page message is printed, she can pick up the bundle and read its contents in sequential order. The printer 15 supports printing in both reverse and sequential order, and the senior or caregiver can modify this setting as desired.

To prevent the printer 15 from being overloaded, the caregiver and/or senior can set a maximum download bundle size. For example, the maximum can be set at twenty pages. If the set of incoming messages exceeds this limit, the remaining messages will be placed in a queue for future delivery. In addition, if a single message exceeds the page limit, it can be placed in the queue. Preferably, the printer 15 comprises an indicator light that is activated if additional messages are in the queue. If desired, the senior can depress the "connect now" feature to retrieve the additional messages. In a further embodiment, the caregiver can review the queue on the web-based interface 22 and remotely force the service to create a connection to the printer 15 to execute delivery of the message.

Settings as to priority of printing can also be configured. For example, the caregiver or senior could prioritize certain information if the printer's ink levels are low and a replacement cartridge has not yet arrived. This would allow the senior to receive the highest priority information first even if other, less important information arrived earlier in the queue.

The printer 15 preferably includes two or more paper trays. One paper tray can include standard white paper and another tray can include photo-quality paper. Additional trays can be added to include colored papers for specific types of information or additional trays of photo or blank white paper as desired.

When the printer 15 receives an incoming message, the message preferably includes information specifying the type of paper on which to print. For example, if the message is a newsletter that the senior receives, the senior or caregiver could program the printer to print such material on standard white paper. In contrast, if the message received is a set of pictures, the printer 15 could be programmed to print the pictures on photo-quality paper. If the printer 15 includes a tray for colored paper, reminders sent to the printer such as reminders of doctor's appointments could be printed on colored paper to indicate to the senior that a reminder has been sent. The information as to the type of paper to use can be programmed by the sender, based on the senior's preference settings, and/or be detected by the service 20 based on the type of information being transmitted. The service 20 could make the determination of the appropriate paper type based on media characteristics such as image size, DPI, color range, and the like.

The printer 15 can also include sensors that can relay information to the service regarding levels of ink, paper and other consumables. In a preferred embodiment, the printer 15 includes a remote ink sensor for each of the one or more ink cartridges. The remote ink sensor can function like a typical "low toner" or "low ink" monitor on a standard printer to detect when levels of printing toner or ink are below a desired level. Preferably, the printer 15 also includes advanced paper level sensors for each of the one or more paper trays such as a paper low sensor or a sensor that can estimate absolute paper level rather than just a sensor that indicates that paper is out.

The remote ink and paper sensors can then transfer this information via the network 30 to the service 20. Information can then be relayed by the service 20 to desired recipients such as a caregiver by email, SMS, MMS, or the like and/or be displayed on the web-based interface 22.

Ink and paper replenishment can also be handled in a way that attempts to anticipate the needs of the senior and the printer 15. In addition to accurate sensors for ink and paper levels, the service 20 can use past printing history to project when new supplies will be needed. The printer 15 can monitor and record the amount of ink and/or paper used by the printer and transfer this information to the service 20. Ink usage can be measured by the system 5 very accurately because the printer 15 only prints as directed by the service 20. Algorithms utilized by the service 20 can estimate ink levels through analysis of the image and text data using factors (per printed page) such as image size, image density, image color composition, text size, text color, amount of text, and banner size and density. In this manner, the system 5 could attempt to schedule periodic deliveries of ink or paper if desired by the user or caregiver. The service 20, aware of the levels of ink in the printer 15, could also modify the makeup of the output to take into account the relative ink levels of individual colors. For example, if one color were running low, images, text, banners, or other areas could be modified slightly to bias ink usage toward or away from a particular color. Also, processing could be done by the service 20 to relatively increase or decrease the overall amount of ink, perhaps by color, based on preferences of output quality, or for reasons to affect the rate of ink usage.

When the service 20 determines that ink or paper levels are low or projects that they will be low, the service 20 can initiate a response in several different manners. In a preferred embodiment, the service 20 can contact a designated caregiver and provide a notification of the shortage. A message can be transmitted to the caregiver by email, SMS, facsimile, via an automated or live voice message delivered by phone, or other method known in the art. The caregiver can program the desired method of sending an alert to the caregiver. In a further embodiment, the caregiver could then order the necessary supplies and have those supplies delivered to the senior. In addition or alternatively, the printer 15 can print out an alert message for the senior. The alert message can include instructions on ordering and/or installing the ink or paper. Instructions for ordering can include phone ordering options and/or e-commerce techniques. The alert can also provide the senior with a simple list of instructions outlining what will happen in the process of replacing the ink or paper. In a further alternative embodiment, ink and paper could be automatically ordered and shipped as necessary using preset shipping and billing information. Ink, paper and other consumables can also be ordered by the senior or caregiver without utilizing the service.

In coordination with the shipment of the consumables, the service 20 can provide any number of status updates and/or instruction pages. These can be used to insure that the delivery and installation process is as smooth as possible. For example, a day or two before an ink cartridge is to arrive, a special instruction page could be printed on the printer. The instruction page could be customized based on the preferred installation procedure for that particular printer. If the senior prefers to install the ink without assistance from another person, the instructions would reflect that process. Alternatively, the normal process might involve the senior calling a neighbor, a relative or a third party tech support agency. In all cases, the instruction page printed would reflect the preferred process. Additionally, shipping status information can be available in real time to the senior, the caregiver, other authorized users, and the help desk 24.

The printer 15 can further include an acknowledgement button that allows the senior to acknowledge receipt of the low paper/ink alert or any other alert regarding the status of the printer or service. The acknowledgement button can also be programmed by the caregiver to create an instant connection with the service 20. In this embodiment, the caregiver would receive nearly instantaneous confirmation that the senior has acknowledged receipt of the alert or other message. Alternatively, the caregiver would have to wait until the next scheduled connection time occurs in order to receive the acknowledgement information.

The senior and caregiver can configure the alert system such that acknowledgement of the alert by the senior prevents such an alert from reaching the caregiver. For example, if the senior were capable of reordering paper and/or ink on her own, then the system would not transmit such an alert to the caregiver if the senior acknowledges receipt of the alert within a specified period of time.

In a further embodiment, the acknowledgement button, either by itself or in combination with other buttons or selected menu items, can allow the senior to directly order new supplies. By depressing the acknowledgement button, the printer 15 can communicate to the service that the senior desires to reorder supplies. The service 20 can then process the senior's request based on information stored in the database 26 such as preferred vendors, requested delivery times and days, preferred paper or ink manufacturers, and the like. Preferably, a confirmation message is sent to both the senior and the person who ordered the supplies (if other than the senior) to confirm receipt of the order, provide an estimated delivery date, etc. The confirmation message to the senior can also include information regarding the proper manner of replacing the ink cartridge, for example.

The printer 15 can also provide information to the service 20 to monitor the status of the senior's printer 15. This information can be transferred during scheduled transactions or via an automatic forced connection if an error exists. Therefore, if a senior or caregiver calls the help desk 24, the help desk 24 will have knowledge of any problems with the printer and can assist the caller with solving the problem. In a preferred embodiment, the database 26 of the service 20 stores information regarding all open support requests and all closed support requests from the senior so that a repeated problem can be diagnosed. The printer 15 can also transmit information to the service 20 regarding printer history, connection history, and the like. Preferably, the printer 15 can inform the service 20 when there is a paper jam or other malfunction that would need to be corrected. If such an error has occurred, the service 20 could alert a help desk to call the senior and/or inform a caregiver of the problem.

In a further embodiment, the printer 15 can include a scanner 51. The scanner 51 can be a flat glass scanner or require the senior to feed the document through the printer. In this embodiment, the senior can respond to messages by simply writing on the message or creating a new document. The scanned response would be sent to the service 20 and distributed as instructed by the senior. For example, if an original message were received from a friend of the senior, the reply message could be forwarded by the service 20 to the senior's friend via email, SMS, facsimile, or other means known in the art. In a preferred embodiment, messages received on the printer contain a watermark, unique identifier or other indicia. The watermark can be used by the service 20 to detect the source of the message. For example, a first caregiver can have a seashell type watermark placed in the upper right hand corner of messages transmitted to the senior. A second caregiver can have a balloon in the bottom left hand corner of each page of message transmitted. The unique identifier could include a human readable identifier such as a number, alphanumeric identifier, or other form of readable identification. In a further embodiment, each page of the displayed or printed message could be given a distinct identifier such that the senior could refer to a specific page as described further below. Alternatively, the printout can include the sender's name, telephone number, email address, or other contract information.

The watermark, unique identifier or other indicia can be used for a variety of purposes. For example, the senior could use the identifier to report messages that were unwanted such as spam messages. The service 20 could then reject future messages from that sender, or investigate the source of the spam. If the senior scans in a reply to a message, for example to say "thanks for the pictures," the service can route the reply to the correct recipient based on the indelible watermark, unique identifier or other indicia on the message. If the senior's forwarding instructions were unclear, the help desk 24 could call the senior to obtain clarifying instructions. In addition, the senior could use the identifier to facilitate resending of a particular page, message or photograph either by contacting the caregiver or through a customer service function at the help desk using a live or automated operator. In another exemplary method of using the identifier, the senior could provide the number to the service 20 and allow her caregiver or friends to view, receive or otherwise access the particular message.

In a further embodiment, the senior can respond to a received message by voice using a voice recorder feature. The voice recorder allows the senior to create a reply message that is then transmitted via the service 20 to the intended recipient. The voice recorder can be integrated into the printer 15 or be a stand-alone feature that can be connected to the printer 15 when desired. Alternatively, the senior could place a telephone call to a preselected phone number associated with the service 20 and leave a recorded message which also specifies the intended recipients of the message. In a further embodiment, the senior can forward a message received along with a voice message. For example, if the senior receives pictures of her grandchildren, she could forward the pictures along with a voice message, such as "I just received these pictures of my 5 year-old granddaughter at her first day of school," to selected recipients.

In yet a further embodiment, the printer 15 can include one or more motion sensors 52 to detect movement around the printer (FIG. 1). Information regarding movement detected by the motion detector 52 can be transmitted to the service 20 and stored on the database 26. If the motion detectors 52 do not indicate movement within a specified period of time, the service can transmit an alert message to a caregiver or other party. To initiate transmission of this message, the printer 15 can be configured to automatically connect to the service 20 if motion is not detected within a specified period of time rather than waiting for the next scheduled connection time. In a further embodiment, if the caregiver is worried about the status of the senior, the caregiver can access the database records regarding motion detector readings via the web-based interface 22 or a phone call to the help desk 24. As an alternative means of detecting the senior's activity, the senior can acknowledge receipt of an incoming message by depressing a specified acknowledgement button. In yet a further embodiment, the printer 15 can report to the service 20 if the senior has removed the printed message from the printer.

Environmental sensors 55 also can be incorporated into the printer 15 or be removably connected to the printer 15 (FIG. 1). For example, sensors for smoke, fire, carbon monoxide, radon, etc. can be integrated or coupled with the printer. In a further embodiment, health sensors 53, such as blood pressure, pulse sensors and the like, can be integrated or coupled with the printer. As with the motion detectors 52, the environmental and health sensors 53, 55 can transmit information to the service 20 and/or provide alerts to a caregiver as desired. Preferably, if these sensors detect an adverse situation, the printer 15 would be activated to connect to the service 20 to inform the service 20 of the situation. A message could then be transmitted by the service 20 to the caregiver and/or authorities such as the police or fire department. Alerts transmitted by the service 20 to the caregiver or other party can be sent to a printer, via email, via facsimile, via an automated or live voice message delivered by phone, SMS or the like.

The system 5 can also include protection against undesired spam messages. Preferably, the printer 15 is configured to dial out only, i.e. it is not able to receive calls. In this embodiment, the printer will not receive unsolicited information via a phone call to the senior. Therefore, information is preferably only transferred to the printer 15 when the printer 15 connects to the service 20. As a further filtering measure, the senior and/or the caregiver can create an address book or list of approved senders. The list senders can include relatives, friends, and approved content vendors as desired by the senior and/or caregiver. The information can be inputted to the service 20 via the web-based interface 22, via email to the service 20, or by submission of a written or oral list to the help desk 24. The address book can include information regarding the contact such as email address, telephone numbers, mailing address, birthday, anniversary, or other information. In a preferred embodiment, when a new contact is added to the senior's address book, an email or other message is sent to that contact informing him that he has been added to the senior's contact list and providing him with the senior's email address.

Figure 3:
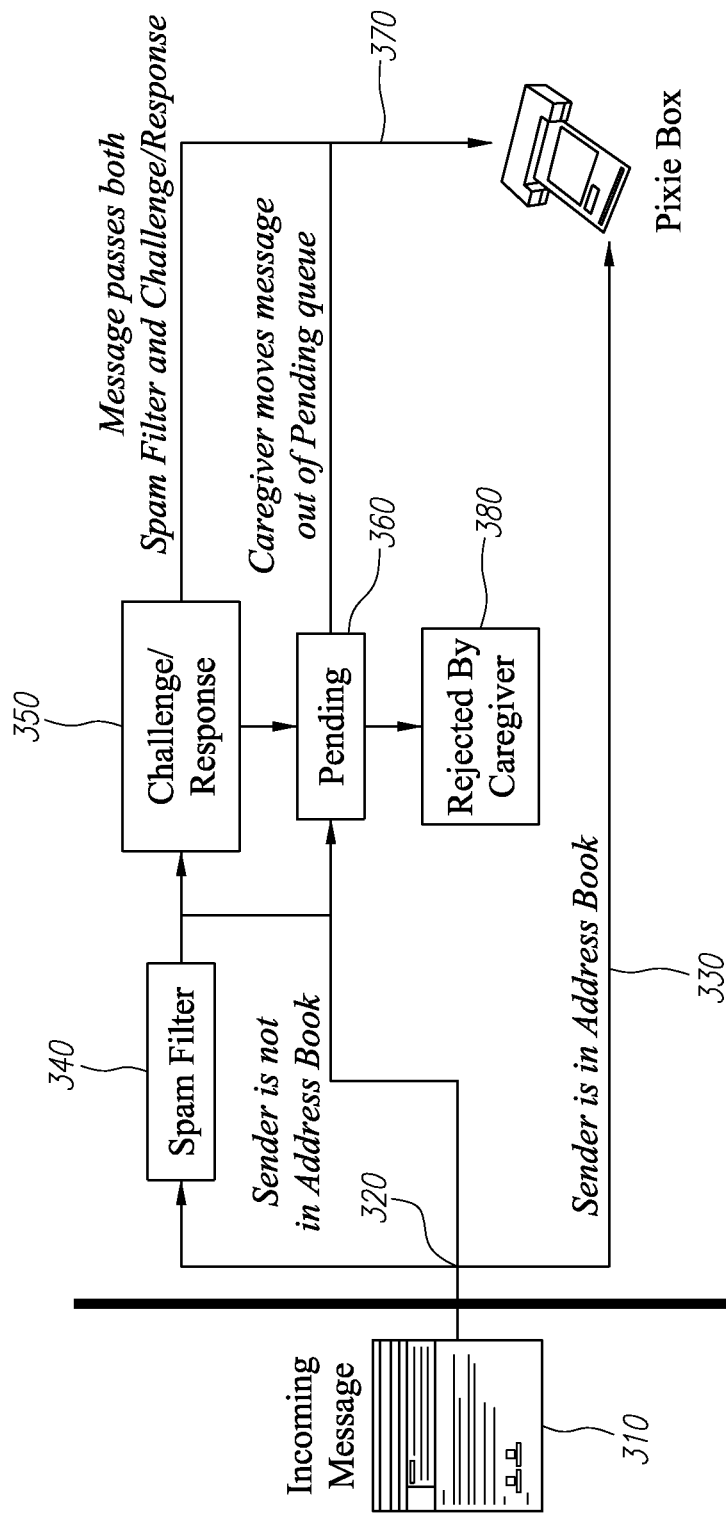
FIG. 3 is a flow diagram showing a method of filtering messages.

Turning to FIG. 3, an incoming message 310 is received by the service at step 320 and is then preferably processed by the filtering means of the service 20 depending on the source of the message. Any person or company entered in the senior's address book can send messages to the senior's printer directly (step 330). Sender's whose email addresses that are not in the address book can still send email to the senior, but first their message goes through a spam filter to check for a known set of tactics used by spammers and spoofers (step 340). Preferably, messages that make it through the spam filter then must complete a standard challenge/response filter prior to being delivered to the senior's printer (step 350). If the message does not pass either the spam filter or challenge/response phase, the message can be deleted or placed in a queue for further review (step 360). In a preferred embodiment, the caregiver conducts the further review. For the sake of the senior's privacy, the senior can optionally designate that only certain information regarding the message is displayed such as the sender's name, email or message subject line, timestamp, and/or an unreadable thumbnail image of the message. Based on this information, the caregiver can opt to take a message out of the queue and forward it directly to the senior (step 370). The caregiver can also choose to add the sender's email address to the address book. If the caregiver recognizes that the message is not intended for or desired by the senior, the message can be rejected (step 380). Alternatively, the senior can manage the queue of messages and inform the help desk whether to forward or delete such messages.

In another embodiment, the service 20 can require a sender to input a password or pin to be able to transmit information to the senior. The service 20 can also provide a filter for messages sent from a mobile phone. If a mobile phone number of an authorized sender is known, the service 20 could allow any messages originating from an address that contains some or all of that phone number, thereby allowing MMS messages to be easily sent from a mobile phone.

In a preferred embodiment, all management protocol (authentication and firmware/configuration updates) is communicated using secure sockets layer (SSL) protocol. Content for printing can also be communicated using SSL protocols. In a further embodiment, secure HTTP (HTTPS) can also be used. The public security certificate for the service 20 is configured as part of the printer 15, and the service 20 can update this certificate as needed. In a preferred embodiment, data transferred to the printer 15 is encrypted to prevent unauthorized access to the messages. The messages can then be decrypted by the printer's software or firmware for printing.

Preferably, each printer 15 is authenticated before being authorized to receive content from the service 20. In a preferred embodiment, the caregiver for a specific senior's account first configures the printer's unique serial number or identification number. The first time the senior's printer 15 connects to the service 20, the service 20 will identify the printer 15 based on the printer's serial number and a private authentication token. The printer 15 stores that token in a secure format and includes the token in all future secure requests to the service. Preferably, the token is never sent over an unencrypted (non-SSL) connection.

As an added security measure, the service 20 can implement a denial of service scheme to protect against repeated authentication requests. The scheme can cover repeated failed requests from the same printer, from different printers using the same source IP address, and the like. The service can also provide protection against uniform resource identifiers ("URIs") that are communicated using non-SSL connections. For example, any URI that is communicated using a non-SSL connection could be validated for only a short period of time. Subsequent calls requesting that particular resource could be referenced by new values even though they refer to the same resource.

The service 20 can also be configured to send reminders to users of the system such as caregivers and friends to stimulate usage of the system 5. By sending reminders to the senior's contacts, this could encourage use of the system 5 and help others learn to use the system 5. The service could send periodic email, according to the preference of each sender reminding the sender to send a message to a device. For example, the schedule of reminders can be based on a preset schedule (such as weekly, monthly, etc.) or be based on the activity level of the sender. In the latter example, the sender could receive a reminder from the service if she has not sent a message to the senior within the last week or other period of inactivity. The reminders could include sample messages, prestructured outlines or templates. In another embodiment, a message can be sent to contacts in the senior's address book periodically that contains information regarding one of the senior's interests such as newsletters, articles, photographs, or the like. The contact could then decide to forward the message to the senior with an attached message.

In a further embodiment, message stimulation could be integrated with a sender's collection of photographs, stored either locally, on the service, on the sender's camera, or on a third party web based service. In this embodiment, a photograph from the service could be selected automatically and delivered to the sender, in a way that requires little or no intervention from the sender in order to forward the photograph to the device. In this exemplary embodiment, the sender can selectively add a short caption or message to the photograph before it is sent to the device. As a further feature of the embodiment, the central service can store information regarding a period summary of images, perhaps thumbnails, to remind the sender what was sent to the device since the last summary. This information could then be transmitted to the sender periodically.

The service could send reminders, according to preferences of individual senders, based on the recent activity of the device. In the case where no message has been delivered for a predetermined amount of time, the service could remind selected senders accordingly.

In addition, at holidays or birthdays, users of the system could receive selections of formatted cards or greetings that could be sent to the senior. For example, on or before the senior's birthday, contacts could be sent a selection of birthday cards via email. If desired, the contact could modify the card to include a personalized message and then transmit the card to the service 20. The service 20 would then deliver the card on the appropriate date to the senior.

Preferably, the senior can also receive such sample cards that she could then personalize and send to desired recipients using the methods described above. For example, if the senior's calendar lists the birthday of her grandchild Danny, the service 20 could send a selection of appropriate birthday cards to the senior a few days in advance of Danny's birthday. The senior could then select a card from among the choices and write a personalized message on the card. Using the scanner 51, the senior could then send the customized card back to the service with instructions to deliver the card to Danny on the appropriate date. In another embodiment, the senior could select a card and then telephone the help desk 24 regarding the personalized message and delivery instructions. In a further embodiment, the senior could obtain pre-stamped or postage paid envelopes, cards, letters or postcards that she could then sign and place in the mail.

The address book can also include a group email address, so that messages are sent to a collection of individuals. For example, a family could set up a family email alias, e.g. smithfamily@xxx.com, so that a message is sent to all members of the family. This will allow families to easily send email messages to each other, thereby stimulating frequent email-based discussions among family members. Other email or address book groups can be formed as desired. For example, the senior can have a church email group.

One method of connecting the service to the device might involve a protocol such as http. In an analogy to the world wide web, the service can be thought of as web servers, serving resources such as pages to be printed, files to be downloaded, configuration information, etc. to the devices, which would be analogous to web browser clients. In the same web analogy, information can be passed using http from the clients (devices) to web servers (service).

In use, the configurations or settings are typically established by the caregiver or senior prior to the first use of the printer 15. As described further above, the settings can determine such features as font, type size, page layout, etc. Alternatively, the senior can choose to use the factory, default. The printer 15 then initiates a telephone call to a service 20 using a designated phone number or other means of connecting to the service 20 via a network 30. Preferably the phone number is a toll free number or a local phone number to prevent charges to the senior. Once connected, the printer 15 transmits identifying parameters over the network 30 to the service 20. The service 20 then authenticates the printer 15 and transmits queued messages to the printer 15. When the senior first uses the system, the service can transmit a welcome message and/or instructions for use of the system.

Figure 4:
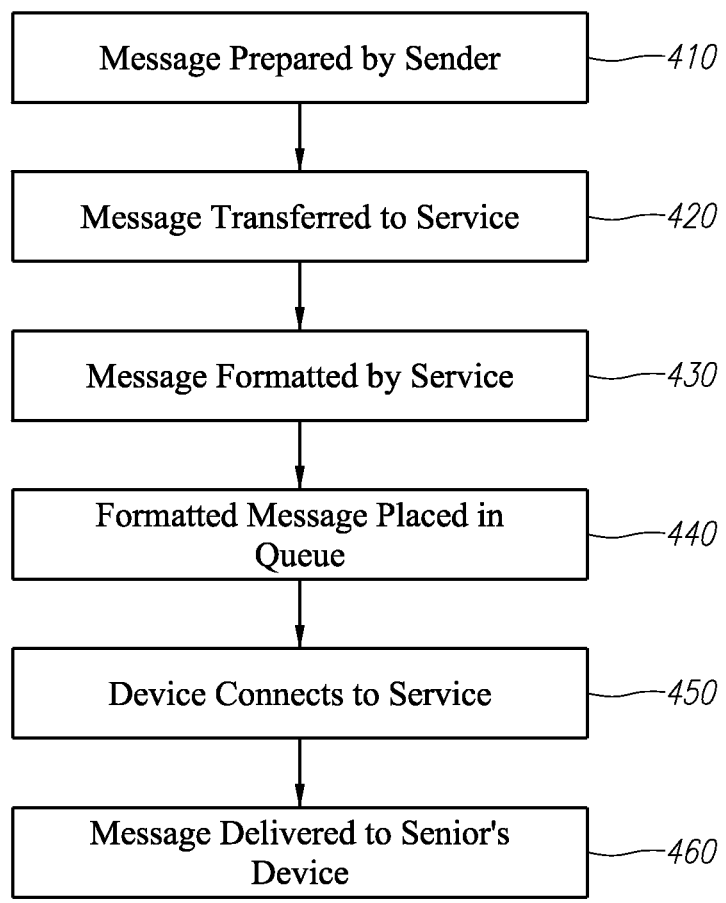
FIG. 4 is a flow chart showing a method of using the present invention.

Turning to FIG. 4, an individual or company wishing to send a message to the senior can log onto a web-based interface 22 and submit a message for delivery to the senior (step 410). Preferably, the web-based interface 22 would perform authentication steps to confirm the identity of the sender and compare this information to the senior recipient's address book or contact information. Alternatively, the sender can compose an email message and send the email message to the senior's email address that is linked with the senior's account or use other means to transmit a message discussed herein or known in the art. Using commonly known methods to verify the identity of the sender of the email, the service 20 would either accept or reject the email message as content for delivery (step 420). The message can contain text, images, audio files, a URL or a link to any of these formats.

The service 20 would then format the messages according to the list of preferences for the particular senior recipient (step 430). For example, if the senior's preferences specify a large font of 18 point, the message is formatted accordingly. The message would then be placed in a queue (step 440). During the next connection period (step 450), the message is delivered to the senior's printer (step 460).

In addition, the caregiver can access the web-based interface 22 or a help desk to check the status of the printer 15 to ensure that the device is operating properly and/or that the printer has sufficient ink, paper, and other consumables. The caregiver can also configure settings, program calendar items, add contacts to the senior's address book, and perform other functions using the web-based interface 22 or help desk 24.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed:

1. A method comprising:
sending a message to a printer associated with a first recipient;
printing the sent message at the printer automatically at a predetermined time, wherein the printed message comprises a watermark being displayed on the printed message;
identifying a sender of the message from the watermark;
receiving a response to the message from the first recipient;
processing the response at a central service; and
determining the page number of a selected page of the printed message from the watermark, wherein a unique watermark is used for each page of the printed message.

2. The method of claim 1 wherein processing comprises determining the correct recipient of the response.

3. The method of claim 1 wherein the response comprises a handwritten message written by the first recipient.

4. The method of claim 1 further comprising transmitting a second message to a second recipient based on instructions provided by the first recipient in the response.

5. The method of claim 1 wherein receiving comprises receiving the response from the first recipient sent via a scanner.

6. The method of claim 1 wherein the response comprises a notification that the message was unwanted and wherein processing comprises adding the sender to a list of restricted senders.

7. The method of claim 1 wherein the response comprises a notification that the message was unwanted and wherein processing comprises investigating the sender of the message.

* * * * *